Patented Apr. 20, 1954

2,676,180

UNITED STATES PATENT OFFICE 2,676,180

CLEANING PHTHALIC ANHYDRIDE CONDENSERS AND LIKE APPARATUS

Howard E. Frank, Monaca, Pa., assignor to Koppers Company, Inc., a corporation of Delaware No Drawing. Application October 21, 1952, Serial No. 316,097

7 Claims. (Cl. 260—346.4)

This invention relates to the manufacture of phthalic anhydride and is particularly directed to processes for cleaning condensers and the like apparatus used in handling crude phthalic anhydride.

In the manufacture of phthalic anhydride by the air oxidation of naphthalene, the crude phthalic anhydride is commonly condensed on the finned surfaces or like heat transfer surfaces of oil-cooled condensers. In a typical process, the oxidation products are passed through such condensers until they are saturated with crude phthalic anhydride and the crude phthalic anhydride which has been thus deposited in the condensers is melted out by passing hot oil or like heating medium through the condensers. In the course of repeated operations, a residue of undetermined nature is deposited on the heat exchange surface of the condenser as well as in lines and on surfaces of other apparatus similarly brought into repeated contact with crude phthalic anhydride. This residue is a hard black deposit consisting of phthalic acid with some phthalic anhydride and unidentified materials which appear to be a mixture of tars derived from the crude naphthalene along with polymerization products of naphthaquinone and condensation products of naphthaquinone with phthalic anhydride and maleic anhydride. The accumulation of this residue reduces the heat transfer capacity of the condenser and ultimately plugs up the condensers and lines utilized in handling the crude phthalic anhydride making it necessary periodically to provide a suitable treatment for its removal.

It has been proposed heretofore to flush out the thus fouled condensers and like apparatus with a sodium hydroxide solution. When practiced, however, this process proved only moderately effective and, moreover, was hazardous due to the caustic nature of the sodium hydroxide solution used.

It has now been found according to this invention that condensers and like apparatus which have thus become fouled in the manufacture of phthalic anhydride can be safely and economically cleaned by flushing them with sodium bicarbonate solution. By flushing a fouled condenser with an aqueous solution of sodium bicarbonate, preferably a hot solution obtained, as for example, by passing hot oil or other heating medium through tube side of the condenser during the flushing operation, the heat transfer surface is freed completely of the accumulated residue, whereas in the prior art practice, using sodium hydroxide solutions, this result is not obtained.

At the same time, the hazard characteristic of strong caustic solutions is eliminated and substantial economies not only in the cost of the material used but also in the length of time required for the operation are obtained.

It appears that the sodium bicarbonate reacts with particles of phthalic acid or other acid material occluded in the deposit of residue to liberate carbon dioxide which literally blows the deposit apart and off the fouled surface. It is to be understood, however, that the invention is not to be limited by this or any other particular theory of operation. It is an observable fact, though, that fouled surfaces which have been cleaned by the processes of the invention are clear and free of residue, having an appearance much as if they had been sandblasted, whereas the cooling surfaces, no matter how thoroughly they were flushed out with sodium hydroxide solution, according to the prior art, were still covered with a film of residue.

In carrying out the processes of the invention, the fouled condenser or like apparatus is simply flushed with an aqueous solution of sodium bicarbonate. A 3 to 5% by weight sodium bicarbonate solution has been found suitable for this purpose. Higher or lower concentrations of sodium bicarbonate may be used, however, ranging from quite dilute solutions up to substantially saturated ones. Ordinarily, however, it will not be necessary or desirable to go below about 2% by weight of sodium bicarbonate or to go above about 25% by weight of sodium bicarbonate.

It is advantageous to flush the contaminated apparatus with a hot solution, advantageously heated to between about 50° C. and about 80° C. Good results, though, can also be obtained by using a cold solution, that is, a solution prepared from the normal cooling water supply without heating. Thus the temperature may range from about 10–25° C. which is the normal cooling water temperature up to about 80° C. Substantially higher temperatures than this should be avoided in view of the possibility of caustic embrittlement. Otherwise, any temperatures up to the boiling point of the solution can be used.

In cleaning a fouled condenser, the hot sodium bicarbonate solution is circulated through the condenser over the contaminated heat-transfer surfaces until the desired cleaning is obtained. No special precautions are necessary other than to provide a vent for the liberated $CO_2$. The concentration of sodium bicarbonate used, ordinarily from 3 to 5%, is so low that no hazard accompanies the operation. Such solutions are so innocuous that they are commonly used for eye washes. Hence in the processes of the invention, there is no hazard due to spillage or leakage as there is in the case of sodium hydroxide solutions.

As illustrative of the effectiveness of the processes of this invention as compared with those of the prior art, reference may be had to the following table showing a comparison of the time necessary to disintegrate a 5 gram lump of residual deposit removed from a fouled condenser:

| Reagent | Concentration | Time |
|---|---|---|
|  | Percent | Minutes |
| Sodium Bicarbonate | 4 | 4 |
| Do | 10 | 4 |
| Sodium Hydroxide | 10 | 240 |

The data of this table show that sodium bicarbonate solutions disintegrate the contaminating residue 60 times faster than sodium hydroxide solutions.

I claim:

1. The method of removing phthalic acid-containing deposits from apparatus used in the handling of crude phthalic anhydride which comprises flushing said apparatus with a sodium bicarbonate solution.

2. The process of claim 1 in which the sodium bicarbonate solution is heated.

3. The process of claim 2 in which the sodium bicarbonate solution contains from 2 to 25% sodium bicarbonate.

4. The process of claim 3 in which the sodium bicarbonate solution contains from 3 to 5% sodium bicarbonate and is heated to from 50 to 80° C.

5. In a process for the manufacture of phthalic anhydride by air oxidation of naphthalene in which the phthalic anhydride is condensed on the cooling surfaces of a condenser and subsequently melted off said surfaces, the method of cleaning said surfaces of residue which is deposited thereon after repeated cycles of said condensing and melting operations which comprises flushing said surfaces with a sodium bicarbonate solution.

6. The process of claim 5 in which the sodium bicarbonate solution contains from 3 to 5% sodium bicarbonate and is heated to from 50 to 80° C.

7. The process of claim 6 in which the sodium bicarbonate solution is heated in situ in said condenser by passing a heating fluid thru the condenser in indirect heat exchange with said solution.

No references cited.